(12) United States Patent
Xie et al.

(10) Patent No.: US 8,027,666 B2
(45) Date of Patent: Sep. 27, 2011

(54) METHOD AND SYSTEM FOR AUTHENTICATING TERMINAL SUBSCRIBER IDENTITY MODULE IN IP MULTIMEDIA DOMAIN

(75) Inventors: Hong Xie, Shenzhen (CN); Jincheng Wang, Shenzhen (CN); Dongming Zhu, Shenzhen (CN); Jiongjiong Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 836 days.

(21) Appl. No.: 11/861,936

(22) Filed: Sep. 26, 2007

(65) Prior Publication Data

US 2008/0064369 A1 Mar. 13, 2008

Related U.S. Application Data

(63) Continuation of application No. PCT/CN2006/001161, filed on May 31, 2006.

(30) Foreign Application Priority Data

May 31, 2005 (CN) .......................... 2005 1 0073363

(51) Int. Cl.
 *H04M 1/66* (2006.01)
 *H04M 1/68* (2006.01)
 *H04M 3/16* (2006.01)
(52) U.S. Cl. ........ 455/411; 455/410; 455/418; 455/419; 455/432.1; 455/432.2; 455/432.3; 455/433; 455/435.1; 370/310.2; 370/322; 370/329; 370/341

(58) Field of Classification Search .................. 455/410, 455/411, 419, 432.1, 2, 3, 433, 435.1; 370/310, 370/310.2, 322, 329, 341
See application file for complete search history.

(56) References Cited

U.S. PATENT DOCUMENTS 6,259,914 B1 * 7/2001 Koster ....................... 455/432.1
(Continued)

FOREIGN PATENT DOCUMENTS

CN 1363195 A 8/2002
(Continued)

OTHER PUBLICATIONS

Haverinen et al., *IEEE Wireless Communications*, 52-60 (Dec. 2002).
(Continued)

*Primary Examiner* — Stephen M D'Agosta
(74) *Attorney, Agent, or Firm* — Leydig, Voit & Mayer, Ltd.

(57) ABSTRACT

A method for authenticating a terminal subscriber identity module in an IM domain includes: sending an AV request to an HSS by the S-CSCF; sending a request message for acquiring the AV to a home device of the UE upon receiving the AV request by the HSS; allocating an SQN for the UE upon receiving the request message, generating an AV based on the SQN, and sending the AV to the HSS by the HLR; sending the AV to the S-CSCF by the HSS; and authenticating the terminal subscriber identity module of the UE according to the AV by the S-CSCF. A system for authenticating a terminal subscriber identity module in an IM domain includes: UE, an S-CSCF, a home device of the UE and an HSS. The invention enables a USIM subscriber to use IM services without changing the USIM card.

17 Claims, 5 Drawing Sheets

U.S. PATENT DOCUMENTS

| | | | |
|---|---|---|---|
| 6,895,439 B2 | 5/2005 | Isomaki et al. | |
| 6,938,090 B2 | 8/2005 | Isomaki | |
| 7,009,940 B2 | 3/2006 | Vialen et al. | |
| 7,024,688 B1 * | 4/2006 | Faccin et al. | 726/4 |
| 7,054,615 B2 * | 5/2006 | Evensen et al. | 455/411 |
| 7,301,938 B2 * | 11/2007 | Ejzak | 370/352 |
| 7,610,619 B2 | 10/2009 | Kastelewicz et al. | |
| 7,624,266 B2 * | 11/2009 | Gabor | 713/168 |
| 2003/0159067 A1 | 8/2003 | Stirbu | |
| 2003/0204608 A1 | 10/2003 | Isomaki | |
| 2003/0236896 A1 | 12/2003 | Isomaki et al. | |
| 2004/0137900 A1 * | 7/2004 | Varonen et al. | 455/433 |
| 2004/0137918 A1 | 7/2004 | Varonen et al. | |
| 2004/0203914 A1 * | 10/2004 | Kall et al. | 455/456.1 |
| 2005/0007984 A1 * | 1/2005 | Shaheen et al. | 370/338 |
| 2005/0097363 A1 * | 5/2005 | Bajko et al. | 713/201 |
| 2006/0077965 A1 * | 4/2006 | Garcia-Martin et al. | 370/352 |
| 2006/0159031 A1 | 7/2006 | Vialen et al. | |

FOREIGN PATENT DOCUMENTS

| | | |
|---|---|---|
| CN | 100428848 C | 10/2008 |
| CN | 101053203 B | 9/2010 |
| EP | 1365620 A1 | 11/2003 |
| EP | 1414212 A1 | 4/2004 |
| EP | 1 524 816 A2 | 4/2005 |
| ES | 2 253 101 A1 | 5/2006 |
| WO | WO 02/082731 A1 | 10/2002 |
| WO | WO 03/091891 A1 | 11/2003 |
| WO | WO 2004/019640 A1 | 3/2004 |
| WO | WO 2004/019641 A1 | 3/2004 |

OTHER PUBLICATIONS

3rd Generation Partnership Project, 3GPP TS 29.002 v6.8.0, 1-1256 (Dec. 2004).

*European Telecommunications Standards Institute*, ETSI TS 133 203, V6.6.0: 1-45 (Mar. 2005).

Siemens, 3GPP TSC CN WG4 Meeting #17, 1-4 (2002).

Vodafone, 3GPP TSG SA WG3 Security, 1-2 (Nov. 2001).

Written Opinion of the International Searching Authority in corresponding PCT Application No. PCT/CN2006/001161 (Sep. 21, 2006).

1st Office Action in corresponding European Application No. 06742048.9 (Jan. 13, 2010).

2nd Office Action in corresponding European Application No. 06742048.9 (Oct. 10, 2008).

1st Office Action in corresponding Chinese Application No. 200680001095.2 (Sep. 5, 2008).

2nd Office Action in corresponding Chinese Application No. 200680001095.2 (Oct. 16, 2009).

Li et al., "Security Improvement of the 3G Mobile Communication System," Journal of Chongqing University of Posts and Telecommunications, Dec. 2002, vol. 14, No. 4, China Academic Journal Electronic Publishing House, Chongqing, China.

"3GPP TS 33.102—3rd Generation Partnership Project; Technical Specification Group Services and System Aspects; 3G Security; Security architecture (Release 6)," Jun. 2004, Version 6.1.0, 3rd Generation Partnership Project, Valbonne, France.

"3GPP TS 33.203—3rd Generation Partnership Project; Technical Specification Group Services and System Aspects; 3G security; Access security for IP-based services (Release 6)," Jun. 2004, Version 6.3.0, 3rd Generation Partnership Project, Valbonne, France.

* cited by examiner

METHOD AND SYSTEM FOR AUTHENTICATING TERMINAL SUBSCRIBER IDENTITY MODULE IN IP MULTIMEDIA DOMAIN

This application is a continuation of International Patent Application No. PCT/CN2006/001161, filed May 31, 2006, which claims priority to Chinese Patent Application No. 200510073363.9, filed May 31, 2005, both of which are hereby incorporated by reference.

FIELD OF THE INVENTION

The present invention relates to the technique of authenticating mobile terminals, and more particularly, to a method and a system for authenticating a terminal subscriber identity module in an IP Multimedia (IM) domain.

BACKGROUND OF THE INVENTION

Multimedia services have been developed to be provided for mobile terminals. The architecture of the present IP Multimedia Subsystem (IMS) providing multimedia services for mobile terminals is as shown in FIG. 1. Originally, the IMS is a sub-domain overlaid on the conventional Packet Switched (PS) domain of the 3$^{rd}$ Generation (3G) network, and the sub-domain is especially for use in supporting IP Multimedia (IM) services. When conditions are met, the IMS can also serve subscribers who access the network via a Wireless Local Area Network (WLAN) or other IP Connectivity Access Networks (IP-CAN).

As shown in FIG. 1, the IMS is primarily composed of a Call Session Control Function (CSCF), a Media Gateway (MGW), a Media Resource Function Controller (MRFC), a Media Resource Function Processor (MRFP), a Media Gateway Control Function (MGCF), a Breakout Gateway Control Function (BGCF), a Subscription Locator Function (SLF) and a Policy Decision Function (PDF), and the Session Initiation Protocol (SIP) is generally used for transmitting the control signaling between various components. A call control component is a key component of the IMS, which mainly implements functions such as call control, address translation, charging, and concealing the mobility of mobile User Equipment (UE); a media gateway component is introduced so as to be compatible with the conventional Public Switched Telephone Network (PSTN). In addition, the Home Subscriber Server (HSS) of the IMS is a device for use in storing the subscription information of an IMS subscriber.

The security function of the IMS includes the authentication of subscribers and the protection of SIP information in the IMS. The security architecture of the IMS is as shown in FIG. 2, where the bidirectional authentication mechanism of IMS Authentication and Key Agreement (AKA) is used for the authentication and Security Association (SA) negotiation between UE and the home network, and the hop by hop fashion is adopted for the encryption and the integrity protection of an SIP message.

Specifically, in the IMS, in order to authenticate an IP Multimedia (IM) subscriber, a dedicated IMS Subscriber Identity Module (ISIM) is used as the authentication module of the subscriber side in the 3$^{rd}$ Generation Partnership Project (3GPP) protocol, and the AKA mechanism of Universal Mobile Telecommunications System (UMTS) is used. The procedure of authenticating subscribers by the IMS system is as shown in FIG. 3, which includes the following steps.

Step 301: while using an IMS service, UE sends a register request to a Serving Call Session Control Function (S-CSCF) via a Proxy Call Session Control Function (P-CSCF) and an Interrogating Call Session Control Function (I-CSCF) in turn.

Step 302: upon receiving the register request, the S-CSCF detects whether a quintuplet Authentication Vector (AV) for the subscriber is saved by the S-CSCF; if yes, the S-CSCF authenticates the subscriber using the AV, i.e. proceeds to Step 304; otherwise, requests an AV from the HSS, i.e. proceeds to Step 303.

The quintuplet AV here includes a random number (RAND), an Authentication token (AUTN), a Cipher Key (CK) used by a Global System for Mobile communications (GSM) network, an Integrity key (IK) and an expected response (XRES).

Step 303: upon receiving the AV request sent from the S-CSCF, the HSS determines the quintuplet AV and sends the quintuplet AV to the S-CSCF.

The process of determining the quintuplet AV by the HSS includes: determining a Sequence Number (SQN) by the Authentication Centre (AUC) built in the HSS itself, and generating the quintuplet AV according to the SQN.

Obviously, in order to raise the efficiency, the HSS generally sends multiple groups of quintuplet AVs to the S-CSCF in sequence, so that the S-CSCF can obtain multiple groups of quintuplet AVs for authentication via one request.

Step 304: the S-CSCF reserves the XRES of the quintuplet AV sent from the HSS or of the quintuplet AV stored by the S-CSCF itself and inserts the RAND, AUTN, CK and IK into an authentication challenge (Auth_Challenge) message, and sends the Auth_Challenge message to the P-CSCF via the I-CSCF.

If the HSS sends multiple groups of quintuplet AVs to the S-CSCF, the S-CSCF may select one group of quintuplet AVs in sequence, and other groups of quintuplet AVs will be used in the next authentication for the subscriber.

Step 305: the P-CSCF reserves the CK and the IK sent from the S-CSCF via the Auth_Challenge message, and issues the RAND and the AUTN to the UE.

If the system starts the integrity protection and security protection, the P-CSCF will use the IK and CK reserved by itself as an encryption key in the subsequent sessions.

Steps 306-307: the UE sends the RAND and the AUTN received from the P-CSCF to the ISIM; the ISIM verifies the AUTN received from the UE and calculates a response (RES) according to the RAND after the verification has passed, and sends the RES calculated by the ISIM to the UE as an authentication response; the UE returns the RES to the S-CSCF while the ISIM further calculates an IK and an CK according to the RAND and sends the IK and the CK calculated according to the RAND to the UE.

The process of verifying the AUTN received from the UE includes: determining whether the Media Access Control (MAC) value contained in the AUTN received from the UE is legitimate and determining whether the Sequence Number (SQN) contained in the AUTN received from the UE is acceptable. At this point, the process of verifying whether the SQN is acceptable is the process of verifying whether resynchronization is needed.

Specifically, the UE sends the RES to the S-CSCF via the P-CSCF and the I-CSCF, and reserves the IK and the CK as encryption key for use in the subsequent sessions.

Steps 308-309: the S-CSCF compares the RES in the authentication response sent from the UE with the XRES stored by the S-CSCF itself; if they are identical, determines that the authentication has passed, and sends an authentication success message to the UE via the I-CSCF and P-CSCF; otherwise, determines that the authentication fails.

The authentication in the IM domain needs to be implemented by using an ISIM alone in the above procedure, that is to say, at present the configured ISIM is especially used for implementing the authentication in the IM domain while no terminal subscriber identity modules that can be used in 3G include an ISIM at present, which makes it impossible for such terminal subscriber identity modules to implement the authentication in the IM domain through the above procedures. For example, the conventional Universal Integrated Circuit Card (UICC) for 3G generally includes a Universal Subscriber Identity Module (USIM) used for authentication in the Circuit Switched (CS) domain and in the PS domain, which makes it impossible to implement the authentication in the IM domain through the above processing for the ISIM. Meanwhile, there are no data related to the USIM in the HSS, which makes it impossible to determine the required AV for authenticating a USIM subscriber, and as a result, impossible to authenticate the USIM directly through the above procedures.

In order to enable the HSS to complete the authentication of a USIM subscriber, one solution is to integrate the data of a Home Location Register (HLR) into the HSS such that the HSS could obtain the data related to the USIM so as to determine the AV. Obviously, it is necessary to replace the conventional HLRs on a large scale. Since the current IMS networks are still at the initial stage, it is impossible on the whole to replace HLRs on a large scale. A more rational solution is to overlay one or more special HSSes for providing IM services on the conventional networks while the conventional HLRs remain unchanged so as to provide the CS and PS domain services continually. According to the solution proposed by 3GPP, however, the HSS overlaid needs to use the ISIM to implement the authentication while the original HLR can use the original USIM to implement the authentication, thereby requiring the subscriber to replace the original card by a card containing an ISIM. In the current operating mode, if a subscriber wants to upgrade his UE, there are various solutions including purchasing a new UE or upgrading the old UE via a Java interface or other interfaces provided by UE manufacturers, which are all highly operable. If the subscriber wants to change the card, however, he has to change it at the special business spots authorized by operators; meanwhile, in order to guarantee the continuity of services, the International Mobile Subscriber Identity (IMSI) of the new card must be associated in some way with the IMSI of the old card, for example, they must share the same HLR, therefore, the actual operation to change a card is surely very boring.

Moreover, even though there are data related to the USIM stored in the HSS and the AV required for authentication of a USIM UE may be determined, other problems still exist, for example, it may cause a resynchronization if one USIM is used for authenticating multiple domains simultaneously. The so-called resynchronization means that the USIM will synchronize the $SQN_{HE}$ in an HSS/HLR with the $SQN_{MS}$ saved in the USIM itself, for example the USIM UE informs the HSS/HLR to replace the $SQN_{HE}$ with the $SQN_{MS}$, in the case that the SQN in the quintuplet AV issued by the HSS/HLR is older than the $SQN_{MS}$ stored by the USIM while the issued SQN is in line with the $SQN_{HE}$ stored by the HSS/HLR and the SQN in the quintuplet AV indicates that the $SQN_{HE}$ is older than the $SQN_{MS}$. Furthermore, if both HSS and the HLR store SQNs, the inconsistency problem of SQNs between the HSS and the HLR may occur, thus, it necessary to resynchronize the SQNs between the HSS and the HLR.

Take the resynchronization between the USIM and the HLR as an example. In order to raise the accessing efficiency of a network, the Visitor Location Register (VLR) corresponding to the CS domain and the Serving GPRS Support Node (SGSN) corresponding to the PS domain in an conventional network generally demand multiple groups of AVs during one accessing process, but use only one group of AVs to conduct the authentication processing each time while saving other AVs automatically. In this case, if operation frequencies in each domain are different, for example, the operation of the subscriber in the CS domain may be more frequent, the SGSN and the VLR obtain five groups of authentication tuple successively, for example, the SQN obtained by the SGSN is 1 to 5 and the SQN obtained by the VLR is 6 to 10, after one group of authentication tuple is used by the SGSN and the VLR respectively, SQN MS stored in the USIM may be 6, while the SQN in other four groups of authentication tuples buffered in the SGSN, namely 2 to 5, is older than the highest sequence ($SQN_{MS}$) received by the USIM. At this point, the $SQN_{MS}$ stored in the USIM is consistent with the SQN issued by the VLR; therefore, the USIM may synchronize the $SQN_{HE}$ in the HLR by using the $SQN_{MS}$ in the USIM itself, thereby making all the AVs currently stored in the SGSN/VLR invalid. The $SQN_{HE}$ is the individual sequence number stored for each subscriber in the HLR/AUC. It can be seen from the above example, if the difference between the operation frequencies in different domains is large, frequent resynchronization will occur.

To sum up, if an IM service is desired at present, an ISIM must be contained in the terminal subscriber identity module of the subscriber or the conventional HLR must be replaced. Obviously, on the one hand, it is not realistic to replace the conventional HLR in a short period. On the other hand, including an ISIM in the terminal subscriber identity module would set a relatively high requirement on the terminal subscriber identity module, which often means that the subscriber has to replace the USIM card. Frequently changing a card, however, will surely make IM services much less attractive and increase the difficulty for operators to promote IM services.

The inventors of the present application, in the design of the present invention, discovered the above issues. Hence it is highly desirable to improve techniques of authenticating a terminal subscriber identity module in an IP Multimedia (IM) domain.

SUMMARY OF THE INVENTION

Embodiments of the present invention provide a method and a system for authenticating a terminal subscriber identity module of UE in an IP Multimedia (IM) domain so that a USIM subscriber can use IM services without changing the USIM card.

The solution in accordance with the embodiments of the present invention is as follows.

A method for authenticating a terminal subscriber identity module in an IP Multimedia (IM) domain includes:

sending, by a Serving Call Session Control Function (S-CSCF) in a network, an Authentication Vector (AV) request to a Home Subscriber Server (HSS) set in the network for providing IM domain services, upon receiving an IM domain register request sent from User Equipment (UE);

sending, by the HSS, a request message for acquiring the AV to a home device of the UE upon receiving the AV request;

allocating, by the home device of the UE, a Sequence Number (SQN) for the UE upon receiving the request message, generating an AV based on the SQN, and sending the AV to the HSS; sending, by the HSS, the AV to the S-CSCF; and authenticating, by the S-CSCF, the terminal subscriber identity module of the UE according to the AV.

An individual sequence number of each UE in the home device of the UE, $SQN_{HE}$, comprises at least one $SQN_{HE}$ corresponding to at least one type of domain respectively;

the process of sending the request message to the home device of the UE comprises:

sending a Sending Authentication Information Message containing the type of requesting node; and the process of allocating the SQN for the UE comprises:

determining, by the home device of the UE, the domain to which the HSS belongs according to the type of requesting node contained in the Sending Authentication Information Message; and allocating the SQN for the domain to which the HSS belongs according to the $SQN_{HE}$ corresponding to the domain to which the HSS belongs.

The at least one $SQN_{HE}$ corresponding to at least one type of domain is selected from the group consisting of: the $SQN_{HE}$ corresponding to the Circuit Switched (CS) domain and the $SQN_{HE}$ corresponding to the Packet Switched (PS) domain; the type of requesting node contained in the Sending Authentication Information Message is selected from the group consisting of: type of the requesting node in the CS domain and type of the requesting node in the PS domain;

the process of allocating the SQN for the UE includes:

determining, by the home device of the UE, whether the domain to which the HSS belongs is the PS domain or the CS domain according to the type of requesting node contained in the Sending Authentication Information Message, and allocating the SQN for the domain to which the HSS belongs according to the $SQN_{HE}$ corresponding to the domain to which the HSS belongs.

The at least one $SQN_{HE}$ corresponding to at least one type of domain comprises: an $SQN_{HE}$ corresponding to the IM domain;

the type of requesting node contained in the Sending Authentication Information Message comprises the type of requesting node in the IM domain; and the process of allocating the SQN for the UE includes:

determining, by the home device of the UE, that the IM domain is the domain to which the HSS belongs according to the type of requesting node contained in the Sending Authentication Information Message; and allocating the SQN for the IM domain according to the $SQN_{HE}$ corresponding to the IM domain.

The at least one $SQN_{HE}$ corresponding to at least one type of domain further is selected from the group consisting of: the $SQN_{HE}$ corresponding to the CS domain and the $SQN_{HE}$ corresponding to the PS domain; and the method further includes:

determining, by the HSS, according to the information configured, whether the home device of the UE is able to allocate the SQN for the IM domain;

containing the type of requesting node in the IM domain in the Sending Authentication Information Message if the home device of the UE is able to allocate the SQN for the IM domain;

containing the type of requesting node in the CS domain or the PS domain in the Sending Authentication Information Message if the home device of the UE is not able to allocate the SQN for the IM domain; the type of requesting node is selected from the group consisting of: type of requesting node in the CS domain and type of requesting node in the PS domain.

The valid range of the SQN allocated for IM domain is less than that of the SQN allocated for the at least one domain selected from the group consisting of: the CS domain and the PS domain by the home device of the UE.

The process of allocating the SQN for the IM domain according to the $SQN_{HE}$ includes: allocating one or more SQNs for the IM domain; the process of generating the AV based on the SQN includes: generating a group of AVs based on each SQN; and the process of authenticating the terminal subscriber identity module of the UE according to the AV includes:

authenticating the terminal subscriber identity module by selecting a group of AVs from the AVs received, and storing other AVs.

The method further includes:

before sending the AV request from the S-CSCF to the HSS, determining, by the S-CSCF, whether there is an AV stored in the S-CSCF for the UE; if there is the AV stored in the S-CSCF for the UE, authenticating the terminal subscriber identity module of the UE according to the AV stored in the S-CSCF; otherwise, sending the AV request to the HSS.

The method further includes: configuring data information of the terminal subscriber identity module in the HSS;

before sending the Sending Authentication Information Message from the HSS to the home device of the UE, determining, by the HSS, whether the UE subscribes to at least one service selected from the group consisting of: a CS domain service and a PS domain service; performing the process of sending the Sending Authentication Information Message if the UE subscribes to the at least one service selected from the group consisting of: the CS domain service and the PS domain service; and calculating the AV according to the data information of the terminal subscriber identity module if the UE does not subscribe to the at least one service selected from the group consisting of: the CS domain service and the PS domain service, and sending the AV to the S-CSCF.

An IMS Private Identity (IMPI) of the UE is used as a subscriber identity between the S-CSCF and the HSS, the method further includes:

before sending the request message from the HSS to the home device of the UE, converting, by the HSS, the IMPI contained in the AV request into an International Mobile Subscriber Identity (IMSI); determining the home device of the UE according to the IMSI and a routing policy; sending the request message to the home device of the UE for acquiring the AV; and before sending the AV to the S-CSCF in Step d, converting the IMSI into the IMPI; and sending the IMPI and the AV to the S-CSCF.

The home device of the UE includes: the Home Location Register (HLR)/Authentication Centre (AUC) of the UE.

The terminal subscriber identity module used by the UE includes: a Universal Subscriber Identity Module (USIM).

A system for authenticating a terminal subscriber identity module in an IP Multimedia (IM) domain includes:

UE, for initiating an IM domain register request;

an S-CSCF, for sending an AV request upon receiving the IM domain register request initiated by the UE, and interacting with the UE for a relative message for authenticating a terminal subscriber identity module of the UE upon receiving an AV;

a HSS, for sending a request message for acquiring the AV upon receiving the AV request sent from the S-CSCF, and sending the AV to the S-CSCF;

a home device of the UE, for allocating an SQN for the UE upon receiving the request message for acquiring the AV sent from the HSS, and generating the AV based on the SQN and sending the AV to the HSS.

The home device of the UE is the HLR/AUC of the UE.

A Home Subscriber Server includes:

means for sending a request message for acquiring an AV to the home device of UE according to an AV request sent from an S-CSCF; and means for sending the AV returned from the home device of the UE to the S-CSCF.

A Home Location Register includes:

means for allocating an SQN for UE upon receiving a request message for acquiring an AV sent from an HSS; and means for generating the AV based on the SQN and sending the AV to the HSS.

AS can be seen from the above mentioned technical scheme, an SQN is allocated by the current home device of UE and the AV is generated according to the SQN allocated by the current home device, thereafter, the AV generated by the current home device is sent to the S-CSCF via the HSS so that a USIM subscriber can use IM services without changing the USIM card, which greatly reduces the difficulty in promoting an IM service.

Furthermore, in accordance with the embodiments of the present invention, range of $SQN_{HE}$ is allocated for a CS domain, a PS domain and an IM domain, respectively, and the subscriber identity module may compare the $SQN_{MS}$ of each domain, respectively, so as to solve the problem of frequent resynchronization in the prior art.

In addition, all the modifications and reconstructions in accordance with the embodiments of the present invention only involve the HSS and the HLR/AUC without any extra requirement for the current GSM/General Packet Radio Service (GPRS)/UMTS, which means only simple upgrading of the HLR/AUC rather than replacement, and make it possible to overlay a special IMS on the conventional network for providing the authentication in the IM domain with less cost and less complexity.

DETAILED DESCRIPTION OF THE INVENTION

Figure 1:
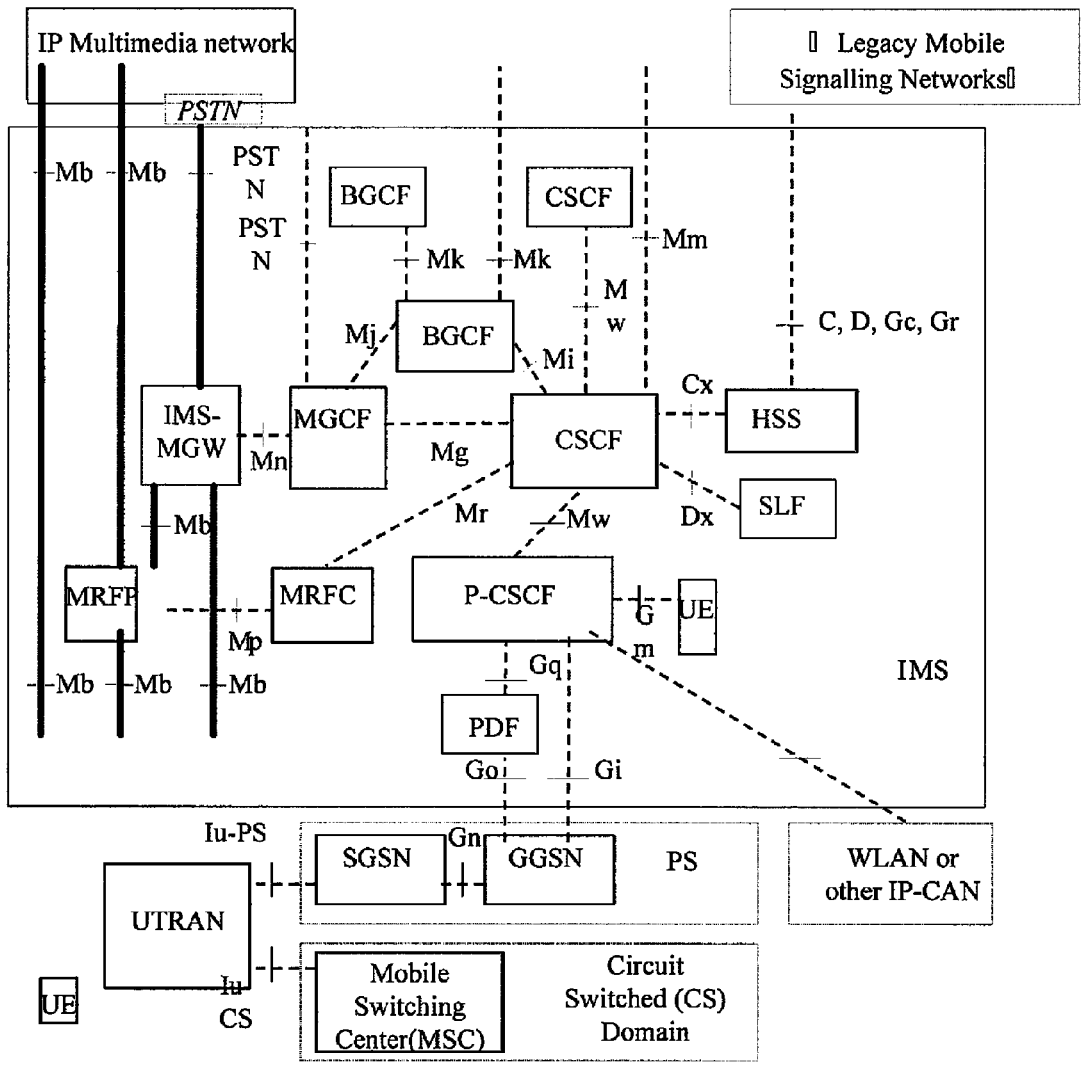
FIG. 1 is a schematic diagram illustrating the conventional IMS structure.
Figure 2:
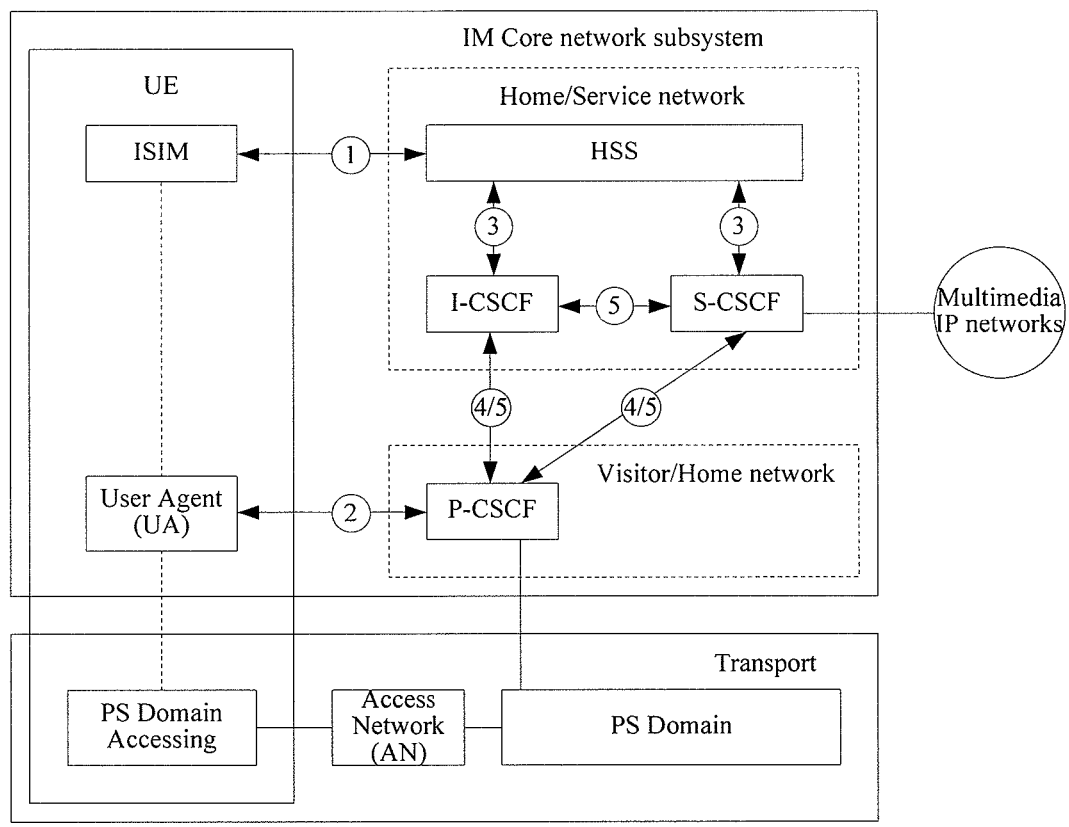
FIG. 2 is a schematic diagram illustrating the security architecture of an IMS.

The following embodiments are merely examples, which should not unduly limit the scope of claims, and one of ordinary skill in the art would recognize many variations, alternatives and modifications.

In accordance with embodiments of the present invention, an HSS needs to be overlaid on the conventional network so as to implement overlaying an IMS on the conventional network. In the case that an HSS is overlaid on the conventional network, in order to share a USIM, during an authentication procedure, after receiving an AV request sent from an S-CSCF, the HSS needs to send a Sending Authentication Information Message for acquiring an AV to the home device of UE, such as an HLR/AUC; the HLR/AUC allocates an SQN for the UE, generates the corresponding AV according to the SQN allocated by the HLR/AUC, and sends the AV to the HSS; the HSS sends the AV received from the HLR/AUC to the S-CSCF, which enables a USIM subscriber to implement the authentication in the IM domain.

In the case that the UE is a USIM UE, after receiving an AV request sent from an S-CSCF and when needing to acquire an AV from the current home device of the UE, an HSS can simulate a VLR or an SGSN to send a Sending Authentication Information Message for acquiring the AV to the current home device of the UE, for example, an HLR/AUC, and the Sending Authentication Information Message shall contain the type of a requesting node of a CS domain or a PS domain; the HLR/AUC determines whether the home domain of the HSS is the PS domain or the CS domain according to the type of the requesting node contained in the Sending Authentication Information Message, allocates SQNs for the home domain of the HSS and calculates AVs according to the SQNs corresponding to the home domain of the HSS, and sends the AVs to the HSS; and the HSS issues these AVs to the S-CSCF.

In addition, in the above process, before sending to the HLR/AUC the Sending Authentication Information Message for acquiring the AV, the HSS further needs to address the HLR/AUC. The process of addressing the HLR/AUC by the HSS may be implemented fully according to the process of addressing the HLR by an MSC/VLR/SGSN in a conventional network. To be specific, since the message path from the UE to the HSS uses the IMS Private Identity (IMPI) of the UE as a subscriber identifier, the message path between the S-CSCF and the HSS uses the IMPI of UE as a subscriber identifier as well; since the MSC/VLR/SGSN addresses the HLR through the IMSI, the HSS needs to implement the conversion from the IMPI into the IMSI and fills the IMSI acquired by the conversion in the Sending Authentication Information Message as a subscriber identifier, and needs to determine the HLR/AUC in which the subscriber is located according to the IMSI and a routing policy of the conventional network. Thereafter the HSS sends the Sending Authentication Information Message to the destination HLR/AUC according to the locally configured Global Title (GT) code or Destination Point Code (DPC); after receiving a response message responded by the destination HLR/AUC, the HSS implements the conversion from the IMSI into the IMPI and issues the IMPI as a subscriber identifier to the S-CSCF.

Obviously, the conventional HLR does not need to be upgraded in the above procedure, and a USIM subscriber does not need to replace the USIM card as well. Since IM domain services occupy the valid range of SQN of a CS domain or a PS domain, however, frequent resynchronization may occur to a certain extent, which would reduce the efficiency of the whole system in a certain way. Obviously, since the HSS simulates either VLR or SGSN to initiate a Sending Authentication Information Message to the HLR, the influence of resynchronization involves only the IM domain and the CS domain or only the IM domain and the PS domain.

In such case that the HSS simulates the VLR or the SGSN, the HSS should simulate the SGSN as much as possible to reduce the frequency of resynchronization due to the lower frequency of authentication operation of the PS domain.

Preferably, in order to completely avoid the possible frequent resynchronization caused by the above, the HSS may explicitly notify the HLR/AUC that the Sending Authentication Information Message for acquiring an AV comes from the IM domain; the HLR/AUC first determines, according to the Sending Authentication Information Message received, that the UE is located in the IM domain and allocates a SQN for the IM domain in which the UE is located, then generates the AV according to the SQN allocated and sends the AV to the S-CSCF via the HSS. Obviously, the conventional HLR/AUC needs to be upgraded in this procedure to support new protocol extension. In other words, the HLR of the conventional network may allocate the SQNs to be issued for a CS domain, a PS domain and an IM domain, so that the USIM can compare the SQNs of various domains respectively and no unnecessary resynchronization will be caused as long as the SQNs corresponding to the authentication tuple of each domain are issued by the HLR in sequence. Since only one network entity of each domain is used for buffering the authentication tuple, for example, the VLR used for buffering the authentication tuple in the CS domain, the SGSN used for buffering the authentication tuple in the PS domain and the S-CSCF used for buffering the authentication tuple in the IM domain, the resynchronization problem can be solved by allocating the SQNs for different domains by the HLR.

The specific solution of avoiding frequent resynchronization fully in accordance with embodiments of the present invention is hereinafter described in detail with reference to accompanying drawings and specific embodiments.

At present, a requesting node type (requestingNodeType) information element is defined in the Sending Authentication Information (MAP-SEND-AUTHENTICATION-INFO) Message in the 3GPP R4/R5/R6 29.002 protocol, which is used for identifying that the type of a requesting node belongs to the CS domain, for example, when the value of the requestingNodeType information element is vlr, or belongs to the PS domain, for example, when the value of the requestingNodeType information element is sgsn. On the basis of such definition, before issuing an AV to an S-CSCF, the HLR first allocates SQNs in an AUTN in an AV for a CS domain and a PS domain, determines, according to the requestingNodeType information element, whether the type of a requesting node is VLR or SGSN, generates the AV according to the SQNs corresponding to the type of the requesting node, and sends the AV generated to the requesting node. Thus, the above operations can guarantee that the SQNs of various domains are issued by the HLR in sequence and enable the $SQN_{MS}$s managed by the USIM to correspond to the CS domain and the PS domain respectively; and the check of SQNs of various domains are relatively independent without interfering with each other so as to avoid the problem of frequently triggering resynchronization due to the different operation frequencies in the two domains.

Therefore, in order to enable the HLR/AUC to allocate SQNs for the IM domain in which the UE is located so as to avoid the above frequent resynchronization caused by the HSS simulating the VLR or the SGSN, the solution of the embodiments includes the extension of the Sending Authentication Information Message, and in particular, includes the extension of the requestingNodeType information element contained in the Sending Authentication Information Message. To be specific, extend the two enumerated values, a value denoting the CS domain, such as vlr, and a value denoting the PS domain, such as sgsn, to three enumerated values, i.e. the value denoting the CS domain, the value denoting the PS domain, and a value denoting the IM domain, such as im, while other information elements may remain unchanged.

After the extension, original VLR/SGSN does not need to be changed and may use the original Sending Authentication Information Message to acquire an AV while the HSS overlaid uses the Sending Authentication Information Message extended to acquire an AV, wherein the requestingNodeType information element corresponding to the IM domain should be written as im. Obviously, the original HLR/AUC needs necessary upgrading, the changes thereof primarily include: malting the HLR/AUC compatible with the Sending Authentication Information Message extended; allocating $SQN_{HE}$s by the HLR/AUC for the CS domain, the PS domain and an IM domain respectively, generating a SQN corresponding to the IM domain according to the requestingNodeType information element contained in the Sending Authentication Information Message and the $SQN_{HE}$ of the IM domain, generating an AV according to the SQN, and then sending the AV generated to the network node that initiates the request.

Since the process of acquiring an AV is identical for the AUC and the HLR, the description is hereinafter given with reference to the HLR only.

Figure 4:
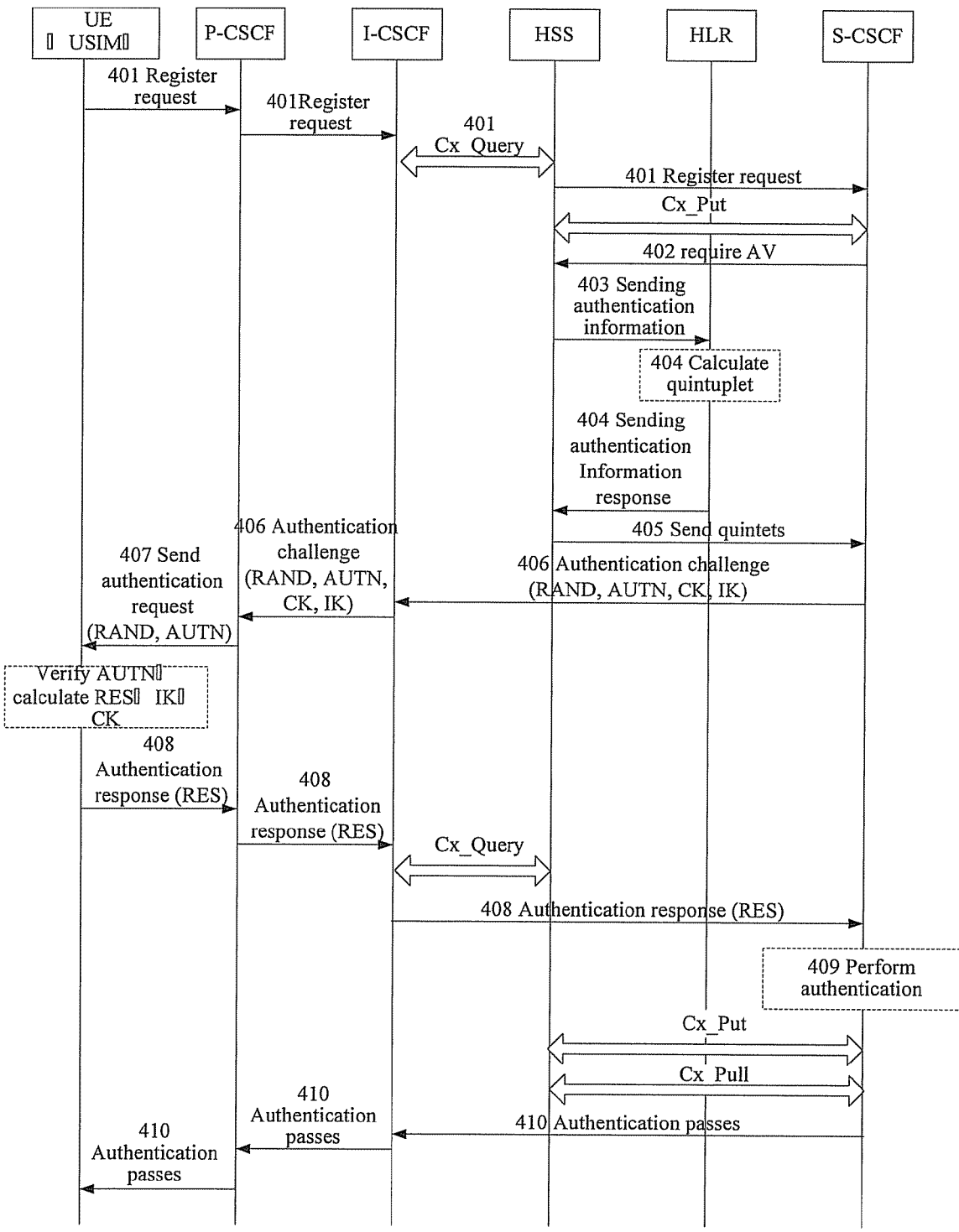
FIG. 4 is a flow chart flow for authenticating the USIM in UE in the IM domain in accordance with an embodiment of the present invention.

By the above configurations, the detailed flow chart of an authentication process is as shown in FIG. 4, which includes the following steps.

Steps 401-402: after receiving an IM domain register request sent from UE, the S-CSCF sends an AV request, Cx-AuthDataReq, to the HSS.

Step 403: upon receiving the Cx-AuthDataReq from the S-CSCF, the HSS sends a Sending Authentication Information Message, MAP-SEND-AUTHENTICATION-INFO message, to the current home device of the UE, i.e. HLR/AUC.

If the HLR has been upgraded to support the new protocol extension, the requestingNodeType information element contained in the MAP-SEND-AUTHENTICATION-INFO message is filled by im; if the HLR has not been upgraded, the requestingNodeType information element contained in the MAP-SEND-AUTHENTICATION-INFO message is filled by sgsn or vlr, and the sgsn is recommended.

The specific process may include: configuring the information in the HSS to indicate whether the HLR can allocate the $SQN_{HE}$ for the IM domain; determining, by the HSS, according to the information, whether the corresponding HLR supports the new protocol extension, and sending the MAP-SEND-AUTHENTICATION-INFO message according to the information.

Step 404: upon receiving the MAP-SEND-AUTHENTICATION-INFO message, the HLR/AUC determines, according to the requestingNodeType information element of the MAP-SEND-AUTHENTICATION-INFO message, which domain the message comes from, generates an SQN that meets the requirement of the domain according to the $SQN_{HE}$ saved by itself, and generates the AV according to the SQN and thereafter sends the AV to the HSS as a response message of the MAP-SEND-AUTHENTICATION-INFO message.

If the HLR/AUC determines that the MAP-SEND-AUTHENTICATION-INFO message comes from the IM domain according to the requestingNodeType information element, the HLR/AUC generates an SQN that meets the requirement of IM domain according to the $SQN_{HE}$ saved by itself; if the HLR/AUC determines that the MAP-SEND-AUTHENTICATION-INFO message comes from the CS domain or the PS domain according to the requestingNodeType information element, the HLR/AUC generates an SQN that meets the requirement of the CS domain or the PS domain according to the $SQN_{HE}$ saved by itself.

Step 405: the HSS sends the AV sent from the HLR/AUC to the S-CSCF.

Step 406: the S-CSCF authenticates the UE according to the AV sent from the HSS.

Figure 3:
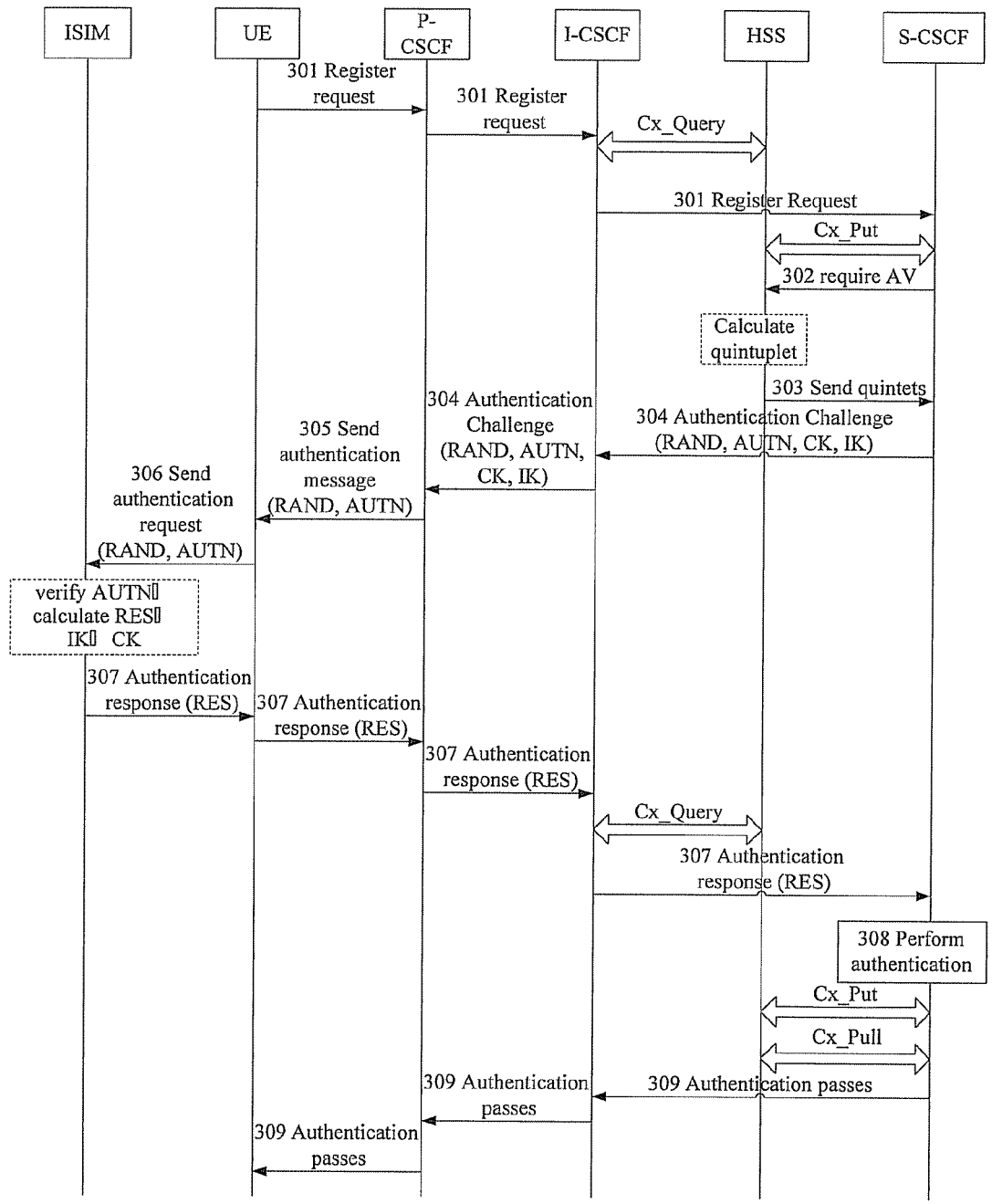
FIG. 3 is a flow chart for authenticating UE by an IMS via an ISIM in the prior art.

After obtaining the AV, the specific authentication procedure of the S-CSCF is the same as described by Step 304 and the subsequent steps of FIG. 3 except that the ISIM needs to be replaced by an USIM, which will not be further described here.

In order to raise the efficiency, after receiving the IM domain register request, the S-CSCF may request multiple groups of AVs from the HSS. In this case, in the above Steps

401-402, after receiving the IM domain register request, the S-CSCF first determines whether a valid AV is still saved by itself, if so, the S-CSCF can authenticate the UE directly according to the valid AV; otherwise, the S-CSCF sends an AV request to the HSS to request multiple groups of AVs. The MAP-SEND-AUTHENTICATION-INFO message forwarded from the HSS to the HLR/AUC is also used for requesting multiple groups of AVs, and the HLR/AUC may allocate multiple SQNs for the IM domain correspondingly and generate multiple groups of AVs according to these SQNs.

In addition, if the UE has not subscribed to a CS/PS domain service, i.e. the UE only subscribes to an IM domain service, the resynchronization will not occur. Therefore, after receiving the AV request sent from the S-CSCF, the HSS may first determining whether the UE has subscribed to the CS/PS domain service, if so, sends the Sending Authentication Information Message to the home HLR/AUC of the UE. As described above, the filled content of requestingNodeType information element in the Sending Authentication Information Message can be determined according to the capability of the HLR/AUC, that is, determined according to whether the HLR/AUC supports the extension of the requestingNodeType information element; if the UE does not subscribe to the CS/PS domain service, the USIM is the same as the conventional ISIM, that is, only supports the IM domain service, which makes it possible to generate and issue an AV in the AUC built in the HSS according to the processing manner of the ISIM. Obviously, the related data of a USIM as that of an ISIM need to be preset in the HSS.

It should be noted that, in terms of the current application conditions, in comparison with the CS domain and the PS domain, the authentication frequency in IM domain is lower, so the HLR/AUC may allocate less range of SQNs for the IM domain.

Figure 5:
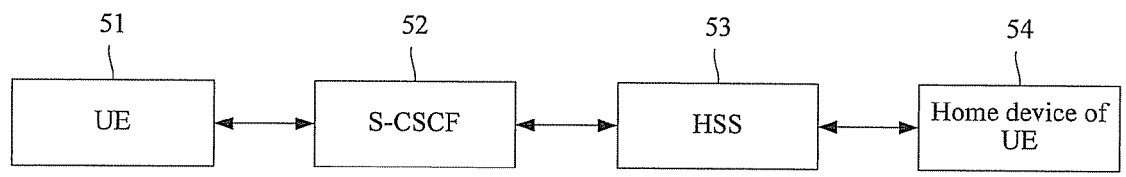
FIG. 5 is a block diagram of the system for authenticating the USIM in UE in the IM domain in accordance with an embodiment of the present invention.

FIG. 5 is a diagram illustrating the system for authenticating the USIM of the UE in the IM domain in accordance with an embodiment of the present invention. As shown in FIG. 5, the system primarily includes: UE, an S-CSCF, a home device of the UE, such as HLR/AUC, and HSS, wherein:

the UE is for use in initiating an IM domain register request to the S-CSCF, and interact with the S-CSCF for the relevant messages for authenticating a USIM of the UE;

the S-CSCF is for use in sending, according to the IM domain register request sent from the UE, an AV request to the HSS, and interact with the UE for the relevant messages for authenticating the USIM in the UE according to the AV sent from the HSS;

the HSS is for use in sending, according to the AV request sent by the S-CSCF, to the home device of the UE a request message for acquiring the AV, and sending the AV returned by the home device of the UE to the S-CSCF;

the home device of the UE is for use in allocating an SQN for the UE according to the request message for acquiring the AV sent from the HSS, and generating the corresponding AV according to the SQN and sending the AV to the HSS.

The foregoing is only preferred embodiments of this invention, and is not for use in limiting the invention. Any modification, equivalent replacement or improvement made under the spirit and principles of this invention should be covered within the protection scope of this invention.

The invention claimed is:

1. A method for authenticating a terminal subscriber identity module in an IP Multimedia (IM) domain, comprising:

sending, by a Serving Call Session Control Function (S-CSCF) in a network, an Authentication Vector (AV) request to a Home Subscriber Server (HSS) set in the network for providing IM domain services, upon receiving an IM domain register request sent from User Equipment (UE);

sending, by the HSS, a request message for acquiring the AV to a home device of the UE upon receiving the AV request, wherein the process of sending the request message to the home device of the UE comprises: sending a Authentication Information Message containing the type of requesting node, and an individual sequence number of each UE in the home device of the UE, SQNHE, comprises at least one SQNHE corresponding to at least one type of domain respectively;

allocating, by the home device of the UE, a Sequence Number (SQN) for the UE upon receiving the request message, generating an AV based on the SQN, and sending the AV to the HSS, wherein the process of allocating the SQN for the UE comprises: determining, by the home device of the UE, the domain to which the HSS belongs according to the type of requesting node contained in the Sending Authentication Information Message; and allocating the SQN for the domain to which the HSS belongs according to the SQNHE corresponding to the domain to which the HSS belongs;

sending, by the HSS, the AV to the S-CSCF; and authenticating, by the S-CSCF, the terminal subscriber identity module of the UE according to the AV.

2. The method of claim 1, further comprising: configuring data information of the terminal subscriber identity module in the HSS;

before sending the Sending Authentication Information Message from the HSS to the home device of the UE, determining, by the HSS, whether the UE subscribes to at least one service selected from the group consisting of: a CS domain service and a PS domain service;

performing the process of sending the Sending Authentication Information Message if the UE subscribes to the at least one service selected from the group consisting of: the CS domain service and the PS domain service; and calculating the AV according to the data information of the terminal subscriber identity module if the UE does not subscribe to the at least one service selected from the group consisting of: the CS domain service and the PS domain service, and sending the AV to the S-CSCF.

3. The method of claim 1, wherein an IMS Private Identity (IMPI) of the UE is used as a subscriber identity between the S-CSCF and the HSS, the method further comprising:

before sending the request message from the HSS to the home device of the UE, converting, by the HSS, the IMPI contained in the AV request into an International Mobile Subscriber Identity (IMSI);

determining the home device of the UE according to the IMSI and a routing policy;

sending the request message to the home device of the UE for acquiring the AV; and before sending the AV to the S-CSCF in Step d, converting the IMSI into the IMPI; and sending the IMPI and the AV to the S-CSCF.

4. The method of claim 1, wherein the at least one SQNHE corresponding to at least one type of domain is selected from the group consisting of: the SQNHE corresponding to the Circuit Switched (CS) domain and the SQNHE corresponding to the Packet Switched (PS) domain; the type of requesting node contained in the Sending Authentication Information Message is selected from the group consisting of: type of the requesting node in the CS domain and type of the requesting node in the PS domain;

the process of allocating the SQN for the UE comprises:
determining, by the home device of the UE, whether the domain to which the HSS belongs is the PS domain or the CS domain according to the type of requesting node contained in the Sending Authentication Information Message, and allocating the SQN for the domain to which the HSS belongs according to the SQNHE corresponding to the domain to which the HSS belongs.

5. The method of claim 4, further comprising: configuring data information of the terminal subscriber identity module in the HSS;
before sending the Sending Authentication Information Message from the HSS to the home device of the UE, determining, by the HSS, whether the UE subscribes to at least one service selected from the group consisting of: a CS domain service and a PS domain service;
performing the process of sending the Sending Authentication Information Message if the UE subscribes to the at least one service selected from the group consisting of: the CS domain service and the PS domain service; and
calculating the AV according to the data information of the terminal subscriber identity module if the UE does not subscribe to the at least one service selected from the group consisting of: the CS domain service and the PS domain service, and sending the AV to the S-CSCF.

6. The method claim 4, wherein an IMS Private Identity (IMPI) of the UE is used as a subscriber identity between the S-CSCF and the HSS, the method further comprising:
before sending the request message from the HSS to the home device of the UE, converting, by the HSS, the IMPI contained in the AV request into an International Mobile Subscriber Identity (IMSI);
determining the home device of the UE according to the IMSI and a routing policy;
sending the request message to the home device of the UE for acquiring the AV; and
before sending the AV to the S-CSCF in Step d, converting the IMSI into the IMPI; and sending the IMPI and the AV to the S-CSCF.

7. The method of claim 1, wherein the at least one SQNHE corresponding to at least one type of domain comprises: an SQNHE corresponding to the IM domain;
the type of requesting node contained in the Sending Authentication Information Message comprises the type of requesting node in the IM domain; and
the process of allocating the SQN for the UE comprises:
determining, by the home device of the UE, that the IM domain is the domain to which the HSS belongs according to the type of requesting node contained in the Sending Authentication Information Message; and
allocating the SQN for the IM domain according to the SQNHE corresponding to the IM domain.

8. The method of claim 7, wherein the at least one SQNHE corresponding to at least one type of domain further is selected from the group consisting of: the SQNHE corresponding to the CS domain and the SQNHE corresponding to the PS domain; the method further comprising:
determining, by the HSS, according to the information configured, whether the home device of the UE is able to allocate the SQN for the IM domain;
containing the type of requesting node in the IM domain in the Sending Authentication Information Message if the home device of the UE is able to allocate the SQN for the IM domain;
containing the type of requesting node in the Sending Authentication Information Message if the home device of the UE is not able to allocate the SQN for the IM domain; wherein the type of requesting node is selected from the group consisting of: type of requesting node in the CS domain and type of requesting node in the PS domain.

9. The method of claim 7, wherein the valid range of the SQN allocated for IM domain is less than that of the SQN allocated for at least one domain selected from the group consisting of: the CS domain and the PS domain by the home device of the UE.

10. The method of claim 7, wherein the process of allocating the SQN for the IM domain according to the SQNHE comprises: allocating one or more SQNs for the IM domain; the process of generating the AV based on the SQN comprises: generating a group of AVs based on each SQN; and
the process of authenticating the terminal subscriber identity module of the UE according to the AV comprises:
authenticating the terminal subscriber identity module by selecting a group of AVs from the AVs received, and storing other AVs.

11. The method of claim 10, further comprising:
before sending the AV request from the S-CSCF to the HSS, determining, by the 5-CSCF, whether there is an AV stored in the S-CSCF for the UE; if there is the AV stored in the S-CSCF for the UE, authenticating the terminal subscriber identity module of the UE according to the AV stored in the S-CSCF; otherwise, sending the AV request to the HSS.

12. The method of claim 1, further comprising: configuring data information of the terminal subscriber identity module in the HSS;
before sending the Sending Authentication Information Message from the HSS to the home device of the UE, determining, by the HSS, whether the UE subscribes to at least one service selected from the group consisting of: a CS domain service and a PS domain service;
performing the process of sending the Sending Authentication Information Message if the UE subscribes to the at least one service selected from the group consisting of: the CS domain service and the PS domain service; and
calculating the AV according to the data information of the terminal subscriber identity module if the UE does not subscribe to the at least one service selected from the group consisting of: the CS domain service and the PS domain service, and sending the AV to the S-CSCF.

13. The method of claim 1, wherein an IMS Private Identity (IMPI) of the UE is used as a subscriber identity between the S-CSCF and the HSS, the method further comprising:
before sending the request message from the HSS to the home device of the UE, converting, by the HSS, the IMPI contained in the AV request into an International Mobile Subscriber Identity (IMSI);
determining the home device of the UE according to the IMSI and a routing policy;
sending the request message to the home device of the UE for acquiring the AV; and
before sending the AV to the S-CSCF in Step d, converting the IMSI into the IMPI; and sending the IMPI and the AV to the S-CSCF.

14. The method of claim 1, wherein the home device of the UE is the Home Location Register (HLR)/Authentication Centre (AUC) of the UE.

15. The method of claim 1, wherein the terminal subscriber identity module used by the UE comprises: a Universal Subscriber Identity Module (USIM).

16. A system for authenticating a terminal subscriber identity module in an IP Multimedia (IM) domain, comprising:
- User Equipment (UE), for initiating an IM domain register request;
- a Serving Call Session Control Function (S-CSCF), for sending an Authentication Vector (AV) request upon receiving the IM domain register request initiated by the UE, and interacting with the UE for a relative message for authenticating a terminal subscriber identity module of the UE upon receiving an AV;
- a Home Subscriber Server (HSS), for sending a request message for acquiring the AV upon receiving the AV request sent from the S-CSCF, wherein the process of sending the request message to the home device of the UE comprises: sending a Authentication Information Message containing the type of requesting node, and sending the AV to the S-CSCF;
- a home device of the UE, wherein an individual sequence number of each UE in the home device of the UE, SQNHE, comprises at least one SQNHE corresponding to at least one type of domain respectively, for allocating a Sequence Number (SQN) for the UE upon receiving the request message for acquiring the AV sent from the HSS, wherein the process of allocating the SQN for the UE comprises: determining the domain to which the HSS belongs according to the type of requesting node contained in the Sending Authentication Information Message, allocating the SQN for the domain to which the HSS belongs according to the SQNHE corresponding to the domain to which the HSS belongs, and generating the AV based on the SQN and sending the AV to the HSS.

17. The system of claim 16, wherein the home device of the UE is the Home Location Register (HLR)/Authentication Centre (AUC) of the UE.

* * * * *

UNITED STATES PATENT AND TRADEMARK OFFICE
CERTIFICATE OF CORRECTION

PATENT NO. : 8,027,666 B2  
APPLICATION NO. : 11/861936  
DATED : September 27, 2011  
INVENTOR(S) : Xie et al.

Page 1 of 1

It is certified that error appears in the above-identified patent and that said Letters Patent is hereby corrected as shown below:

Column 14, line 24, "5-CSCF" should read --S-CSCF--.

Signed and Sealed this
Sixth Day of December, 2011

David J. Kappos
*Director of the United States Patent and Trademark Office*